Feb. 17, 1931.  J. B. ZIMMERS  1,793,297
DRIP AND TRIM MOLDING
Filed May 10, 1927
Fig. 1.
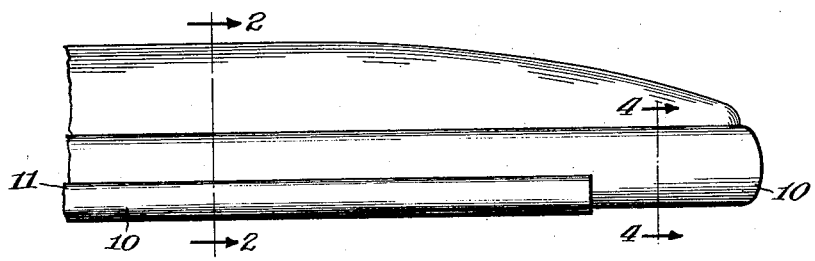
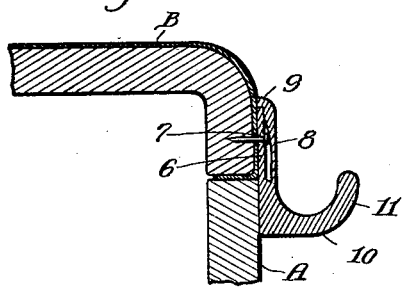
Fig. 2.
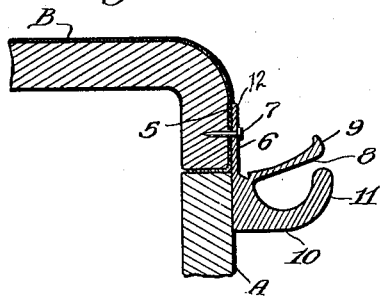
Fig. 3.
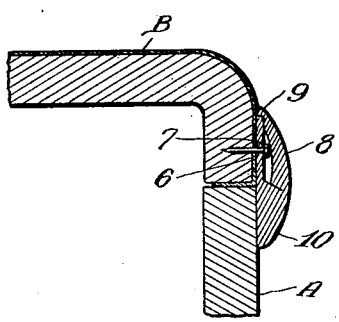
Fig. 4.
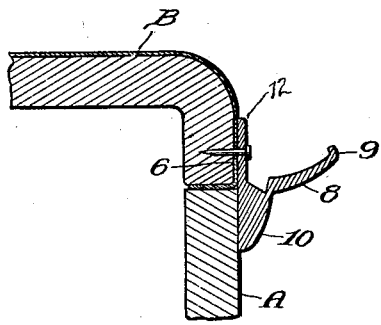
Fig. 5.
Inventor
Joseph B. Zimmers
By Winfield Williams
Atty Patented Feb. 17, 1931

1,793,297

UNITED STATES PATENT OFFICE

JOSEPH B. ZIMMERS, OF CHICAGO, ILLINOIS, ASSIGNOR OF THIRTY ONE-HUNDREDTHS TO WILMA M. ZIMMERS, THIRTY ONE-HUNDREDTHS TO ANNA L. HERRON, TWENTY ONE-HUNDREDTHS TO OLLIE L. HERRON, AND TWENTY ONE-HUNDREDTHS TO HIMSELF, ALL OF CHICAGO, ILLINOIS

DRIP AND TRIM MOLDING

Application filed May 10, 1927. Serial No. 190,350.

My invention pertains to a finishing molding for vehicles, and more especially to the types of molding and drip trough used on closed body automobiles near the top where the fabric covering the top ordinarily ends on a side near the top.

The primary object of my device is to construct a molding for the purposes described which shall be simple in construction, easy of application and forming a complete finish in and of itself.

The accompanying drawing illustrates an embodiment of my invention in which Fig. 1 is an elevation of a section of an upper portion of the body of an automobile. Fig. 2 is a cross section of Fig. 1 at arrows 2—2, showing the device attached and complete. Fig. 3 is similar to Fig. 2, except that it shows the position of the molding after being attached but prior to pressing the cover into position. Fig. 4 is a cross section of Fig. 1 at arrows 4—4, showing the trim molding without a drip extension. Fig. 5 is similar to Fig. 4, except that the covering portion of the molding is shown after attaching and prior to it being pressed into finished shape.

In the manufacture, construction and use of the automobile, it is very well known that several features of importance have to be considered in the molding ordinarily used and applied at or near the upper edge of the body A where the top fabric B is attached to the body, and where the doors must be protected against inclement weather conditions. As illustrated, the device consists of a base portion 6 which has attaching means 7 spaced along its area. Unitary with and extending from a portion 10 of the face wall of the base 6, I provide a portion 8 having a slightly hooked end 9. The article is so devised that it may be easily attached at 7 to the body A of an automobile; the portion 8 being so devised that when the molding is attached to the body of a vehicle the portion 8 may be pressed toward the base 6 until the hooked portion 9 lies over an edge 12 of base 6; and the member 8 is so devised as to thickness that when it is closed over the attaching means 7 a clearance space is provided for clearing the attaching means. I provide a relief 13 where the metal is thin to accomplish easy manipulation of the member 8 yet providing for a solid smooth surface when the lip 8 is pressed up into finished position. The molding trim form may be used in reversal from that shown. I preferably manufacture the article of a metal which is readily extrudable and somewhat pliant. I show an extension of a portion of the base 6 forming a drip trough lip 11. The method of installing the article is by simply attaching the outer base portion of the article to a body and then pressing the portion 8 up into a position where 8 covers the attaching means and 9 forms a shelf over 12 for the throwing off of moisture.

The present invention is an improvement upon the invention set out and claimed in the co-pending application of Leo L. Williams, Ser. No. 234,288, filed November 18, 1927, on Molding for automobile bodies and the like.

I do not limit myself to the specific detail as shown and described, and am only limited by the scope of my claims.

I claim:

1. An article of manufacture comprising a molding of pliable extruded metal consisting of a base portion having attaching means spaced along the length of the base portion: unitary with the base and projected from a point substantially central of the base, a flying bridge portion extending outwardly from the face thereof terminating in a depending shoulder, the length of the flying bridge portion being such that when the base is attached to a body the flying bridge portion may be pressed to a position bridging the attaching means, the depending shoulder portion being adapted to lie adjacent to and lap over a longitudinal edge of the base portion, covering the attaching means and the end of the base portion whereby to form an uninterrupted surface.

2. An article of manufacture constructed of a narrow, longitudinal strip of malleable metal comprising on a base a longitudinal portion having an enlarged body and extending outward therefrom a drip trough; at a substantially central point of the base portion where the enlarged body flows into the attaching portion, a wall, from the edge of which extend a flying bridge portion terminating in a depending shoulder portion, the said flying bridge portion being of a length sufficient to cover the attaching portion of the base, bridging the attaching means, the said shoulder portion adapted to coact with the longitudinal edge of the attaching portion of the base when the said flying bridge portion is pressed into final position whereby to form a surface superficially solid longitudinally.

Signed at Chicago, Illinois, May 7th, 1927.

JOSEPH B. ZIMMERS.